United States Patent [19]
Roth et al.

[11] Patent Number: 5,362,471
[45] Date of Patent: Nov. 8, 1994

[54] PROCESS FOR PRODUCING GYPSUM FLAKE FROM FLUE GAS DESULFURIZATION

[75] Inventors: Timothy J. Roth, Allentown, Pa.; Carmine R. Gagliardi, Emmaus, Pa.; William R. Welliver, Ship Bottom, N.J.

[73] Assignee: Air Products and Chemicals, Inc., Allentown, Pa.

[21] Appl. No.: 767,283

[22] Filed: Sep. 27, 1991

[51] Int. Cl.$^5$ ............................................ C01F 11/46
[52] U.S. Cl. ................... 423/555; 23/293 A; 23/313 R; 264/109; 106/786; 423/170
[58] Field of Search ............. 423/555, 170; 23/293 A, 23/313 R; 264/109, 120; 425/222; 106/786

[56] References Cited

U.S. PATENT DOCUMENTS

| | | | |
|---|---|---|---|
| 3,497,321 | 2/1970 | Decker et al. | 23/313 |
| 3,779,686 | 12/1973 | Kerttula et al. | 425/371 |
| 3,820,970 | 6/1974 | Watkins | 71/1 |
| 4,173,610 | 11/1979 | Huller et al. | 264/28 |
| 4,239,716 | 12/1980 | Ishida et al. | 264/86 |
| 4,377,414 | 3/1983 | Buschmann et al. | 106/85 |
| 4,544,542 | 10/1985 | Angevine et al. | 423/555 |
| 4,954,134 | 9/1990 | Harrison et al. | 23/313 R |
| 5,121,683 | 6/1992 | Biefeldt | 100/38 |
| 5,154,874 | 10/1992 | Koslowski | 264/333 |

OTHER PUBLICATIONS

"Agglomeration: Growing Larger in Applications and Technology" by Jon E. Browning in Chemical Engineering, 4, Dec. 1967 pp. 147–169.

*Primary Examiner*—Gary P. Straub
*Assistant Examiner*—Timothy C. Vanoy
*Attorney, Agent, or Firm*—Russell L. Brewer; William F. Marsh

[57] ABSTRACT

This invention relates to an improved process for producing gypsum calcium sulfate dihydrate flakes from powdered gypsum calcium sulfate dihydrate obtained from the desulfurization of flue gas by the wet limestone process. The flakes have sufficient size and strength such that the gypsum calcium sulfate dihydrate can be handled and processed in conventional equipment commonly used by wallboard manufacturers and others in the construction industry. The intermediate calcium sulfate dihydrate from the desulfurization process is dewatered to about 5 to 12% by weight and then compressed into a thin sheet under a compaction or compression load of 4 tons force to 15 tons force per linear inch of sheet width. A linear speed of from 0.5 to 2.5 feet per second is maintained during compaction providing a compaction residence time of from about 0.2 to 1.2 seconds. An elevated temperature is maintained during the compaction process to enhance the reformation of the crystal size and shape of the gypsum calcium sulfate dihydrate. The combination of pressure and temperature on the moist gypsum calcium sulfate dihydrate alters the physical characteristics of the gypsum calcium sulfate dihydrate, thereby resulting a sheet which breaks into hard flakes on exit from the compaction zone.

6 Claims, No Drawings

PROCESS FOR PRODUCING GYPSUM FLAKE FROM FLUE GAS DESULFURIZATION

TECHNICAL FIELD

This invention pertains to an improved process for producing flakes from gypsum calcium sulfate dihydrates obtained from the desulfurization of flue gas by the wet limestone process with forced oxidation.

BACKGROUND OF THE INVENTION

Gypsum, which is calcium sulfate, has wide application in the manufacture of construction products and particularly wallboard. Gypsum is obtained from two different sources, the predominant source being natural gypsum. Natural gypsum is mined and the particulate or rock form gypsum is ground to a powdery state wherein it is heated and mixed with other additives, etc. Natural gypsum is preferred by manufacturers of wallboard and other commercial products to synthetic gypsum because it lends itself to ease of handling and to the preparation of fine quality wallboard.

Synthetic gypsum is generally obtained as a byproduct in the manufacture of phosphate containing fertilizers and as a byproduct in the desulfurization of flue gas. Neither byproduct has experienced widespread commercial succeeds for the formation of quality products. Usually synthetic gypsum has represented a disposal problem rather than a commercial product to those associated with the byproduct manufacture of calcium sulfate. Synthetic gypsum has a different crystal size and shape than natural gypsum and that difference has been used as a basis for explaining the difference in physical properties obtained in commercial products.

Desulfurization of flue gas is accomplished by one process known as the "wet process with forced oxidation" wherein the flue gas containing sulfur dioxide is contacted with calcium carbonate (limestone) or lime generating an intermediate calcium sulfite product. The interim calcium sulfite is oxidized to calcium sulfate dihydrate by contacting the mixture of calcium carbonate and calcium sulfite with an oxygen containing gas under oxidizing conditions. Gypsum, calcium sulfate dihydrate, obtained from flue gas desulfurization by the wet limestone process is in the beta crystal form which is sometimes a crystal form of hemihydrate or anhydrite. The powder has extremely poor flow characteristics, it agglomerates or sticks together and does not exhibit free flow in storage hoppers and bins. As a result of these poor handling properties, synthetic calcium sulfate dihydrate obtained as a byproduct from the desulfurization of flue gas by the wet limestone process is not well suited for the manufacture of wallboard or well suited for other applications which require an easily processible material.

There is substantial art regarding the generation of gypsum calcium sulfate dihydrate obtained as a byproduct from industrial processes. Representative patents which address the recovery of gypsum calcium sulfate from industrial processes include the following:

U.S. Pat. No. 3,820,970 discloses a process for producing gypsum granules or pellets resistant to dusting by admixing calcium sulfate dihydrate with from about 10–20% of calcium sulfate hemihydrate and 2–4% water. The substantially dry solid-liquid mixture is compacted at pressures of 1,000–2,000 psi, and the resulting sheet material broken to form flakes and the flakes crushed to the desired granular size. Higher levels of water were alleged as resulting in very dusty and friable granules.

U.S. Pat. No. 4,173,610 discloses a process for producing pelletized calcium sulfate from finely divided natural or synthetic calcium sulfate. The patentees point out that it was typical in prior art processes to transform finely divided calcium sulfate into lump calcium sulfate by addition of binding agents such carboxymethyl cellulose or crystal modifying substance. In producing lump calcium sulfate in a single operation, the finely divided base material is adjusted to have a free water content of from about 0.5 to 4% by weight and then compacted in a roll press to form pellets or a lump type material. Temperatures of compaction range from about 0° to 60° C. and roll pressures range from about 1 to 5 metric tons per centimeter (Mp) of roller length.

U.S. Pat. No. 4,544,542 discloses a process for producing pelletized gypsum from a dry flue gas desulfurization process. Small amounts of low-melting constituents such as sodium carbonate, sodium silicate or calcium chloride are added to the precursor calcium sulfite and then oxidizing the calcium sulfite material to calcium sulfate. The low melting constituents in the liquid phase then agglomerate with the calcium sulfate to form pellets.

U.S. Pat. No. 4,377,414 discloses a process for the production of pellets of gypsum using the desulfurization product obtained from flue gas desulfurization using the dry scrubbing technique in combination with fly ash. In forming the pellets, a fly ash containing powder is admixed with microparticulate crystallites of desulfurized scrubber material, e.g., calcium sulfate and then mixed with water to from a powder/water mixture. This mixture is shaped under compaction and cured. The product can be characterized as fly ash particles coated with desulfurization product and unreacted agent.

U.S. Pat. No. 4,954,134 discloses a process for producing pellets of gypsum obtained from a feedstock of phosphogypsum. The process utilizes a granulating/dispersion aide comprising a lignosulfonate solution.

Summarizing the prior art, calcium sulfate obtained by the desulfurization of flue gas utilizing the wet limestone process has had limited commercial acceptance and encountered many difficulties in conversion to materials suitable for construction. There is substantially no market for this type of gypsum calcium sulfate. This product in finely divided powdery form, has poor flow, it is sticky, cohesive and it has poor handling characteristics. It also has limited structural load-bearing capabilities.

SUMMARY OF THE INVENTION

This invention relates to an improved process for producing gypsum calcium sulfate dihydrate flakes having sufficient size and strength such that the gypsum calcium sulfate dihydrate, can be handled and processed in conventional equipment commonly used by wallboard manufacturers and others in the construction industry. These flakes or chips also have properties such that when the flakes are ground to a powdered state, the particulates have a crystal size, shape, and particle size distribution approaching. The flakes have sufficient hardness to minimize dusting and fracturing. More particularly, gypsum calcium sulfate dihydrate obtained by the desulfurization of flue gas using the wet limestone process is generated as an intermediate product from a milky slurry. The intermediate product is dewatered to a free water content of from about 5 to 12% by weight and then compressed in a compaction zone comprising a roller type press into a thin sheet under a compaction or compression load of 4 tons (2,000 pounds) force to 15 tons force per linear inch of sheet width. A linear speed of from 0.5 to 2.5 feet per second is maintained during compaction providing a compaction residence time of from about 0.2 to 1.2 seconds. An elevated temperature, typically of the compression roll faces, is maintained during the compaction process to enhance the reformation of the crystal size and shape of the gypsum calcium sulfate dihydrate.

The combination of pressure and temperature on the moist gypsum calcium sulfate dihydrate alters the physical characteristics of the gypsum calcium sulfate dihydrate, thereby resulting a sheet which breaks into flakes on exit from the compaction zone. The fractured sheet of gypsum calcium sulfate dihydrate is in the form of chips ranging in size from about ¼" to 1" on a side.

Several advantages are achieved by the process of this invention and these advantages include: the generation of chips which are resistant to breaking and resistant to abrasion. Other features of the chip include enhanced processibility due to improved flow characteristics, e.g., they may be mechanically conveyed, handled or stored, and they can be processed easily in conventional grinding and calcining equipment for conversion into wallboard. Other advantages include a product which has improved load bearing capability. Also, because the gypsum calcium sulfate is processed "wet" as compared to prior art processes, energy and capital costs associated in reducing such moisture are lower.

DETAILED DESCRIPTION OF THE INVENTION

The gypsum calcium sulfate dihydrate utilized in this process is obtained by a process referred to as the wet process, and in particular the wet limestone process with forced oxidation for the desulfurization of flue gas. In this process flue gas containing sulphur dioxide is passed through an aqueous slurry of finely divided limestone (calcium carbonate). The sulfur oxides on contact with calcium carbonate are converted to calcium sulfite containing compositions. Oxygen is passed through the aqueous mixture containing the calcium sulfite desulfurization product and the calcium sulfite is converted to calcium sulfate. The calcium sulfate precipitates from the batch and is centrifuged or otherwise dewatered to a surface moisture or free water content of about 5 to 12%, preferably 7–10%, by weight. If the gypsum calcium sulfate dihydrate obtained from the product is dried to a finely divided particulate powder, as may be done commercially, water can be added to the powder to raise the level of surface water or free water content in the gypsum calcium sulfate dihydrate to a level from about 5–12% by weight. Preferably, though in the processing of wet calcium sulfate dihydrate, the free water is not removed so that energy costs may be minimized.

The moist powder containing from about 5 to 12% free water, preferably 7 to 10% free water by weight, then is charged to the roller press compaction zone for conversion into a compacted sheet of gypsum. The sheet of gypsum then is allowed to fall onto a continuously moving conveyor belt with the conveyor belt being positioned such that the sheet breaks into flakes. The sheet typically will have a thickness of from about 0.05 to about 0.25 inches, preferably 0.1 to 0.2 inches. If the flakes have not broken into small enough particles, the larger chips may be passed under another roller or granulator in which further breaking of the chip is effected. The resulting chips or randomly broken flakes will have a dimension of about ¼ to 1 inch on a side.

Often in the chip formation process, it is desirable to add the moist synthetic gypsum calcium sulfate powder to preformed chips or fines. The combination of powder plus fines often results in producing a chip (twice or more through the compaction zone) that has a tougher and harder surface skin and is less susceptible to dusting and breakage. In those cases, the powder generally will comprise from about 50–80% of the total weight of the product on a dry basis.

As stated, compaction of the moist gypsum calcium sulfate dihydrate is effected in a compaction zone and conditions are maintained such that a pressure of from 4 tons (force) to 15 tons (force) per linear inch of sheet width is maintained. In addition, the temperature of the roll press is maintained between 25° C. and 80° C. for the purpose of enhancing the transformation of crystal size and shape of the gypsum to a more desirable form. Transformation appears to be effected by the combination of heat and pressure on the gypsum calcium sulfate dihydrate. The rate of compaction can be regulated at the discretion of the operator, but typically a linear speed of 0.5 to 2.5 feet per second will be used such that a residence time of from 0.2 to 1.2 seconds at the pressures and temperatures recited will be maintained. When the compaction pressure falls toward the lower end of the desired pressure compaction range, the powdered gypsum calcium sulfate dihydrate does not agglomerate sufficiently to other particulate gypsum calcium sulfate in the flake. Quite often if compaction is inadequate the flake may result in some dusting and breakage on handling. The dusting or breakage of the flake is measured via screening thereof and it is desired that the fines in the flake or chip are less than 25%, preferably less than 18% of the screened product (fines are particulates passing an 8 U.S. mesh sieve).

Various means for compaction may be used but roll presses are preferred for reasons of efficiency and economy. A double roll press with one roll being hydraulically forced against the other roll to effect compression and effect a shear force has been used with success. Both rolls are driven via an electric motor and rotate in opposite directions to pull or draw material into the compaction zone. Typically, the roller diameters will range from 1.5 to 3 feet and have a speed of from 6 to 30 rpm. This will provide a linear surface speed of from 0.5 to 2.5 feet per second. Generally the roll faces are smooth surfaces without pocket or striations. Other types of roll presses may be used, as for example a double roll press where one of the rollers is held stationary or a roller-belt combination.

Additives may be used for their desired purpose, e.g. to enhance agglomeration, e.g. lignosulfates, carboxymethylcellulose and other agglomerating and strengthening agents including those used in prior art processes. However, the gypsum calcium sulfate dihydrate can be processed into suitable flakes or chips without agglomerating additives.

Summarizing, and although not intending to be bound by theory, it is believed that the conditions utilized in forming the flakes is attributable to the uniqueness of the gypsum calcium sulfate dihydrate obtained as a product. Heretofore, gypsum calcium sulfate dihydrate obtained by the wet limestone process for the desulfurization of flue gas had poor physical properties. Gypsum calcium sulfate dihydrate obtained by prior art teachings had a crystal size structure unlike calcium sulfate dihydrate obtained from natural sources or the alpha calcium sulfate form.

Another unexpected benefit of this process, vis-a-vis processes utilized to recover byproduct gypsum calcium sulfate obtained from sources other than the wet process, and particularly the wet limestone process, is that the gypsum calcium sulfate is essentially processed "wet" and therefore less energy is required for producing a commercial product. The prior art processes in the manufacture of gypsum calcium sulfate from byproduct calcium sulfate must "dry" the interim product to a level of less than about 4% whereas this product is generally processed at a level of from 7-10% moisture. Removing water to the lower level requires considerable energy and capital because of dryer costs. In contrast, the process of this invention eliminates the need for drying to low moisture levels and drying of the product is effected in the process equipment, e.g., roller mills and grinding equipment. Another advantage is that the undesirable stickiness and poor flow characteristics of the powdered gypsum calcium sulfate obtained by the wet limestone process gypsum feeds readily to roller presses for compaction, thus eliminating the need for special feeder devices or special roller surfaces to process the gypsum. Other types of gypsum are difficult to process at these moisture levels and products unsuited for commercial application are produced.

The following examples are provided to an illustrated embodiment of the invention and are not intended to restrict the scope thereof.

EXAMPLE 1

Preparation of Gypsum Calcium Sulfate Dihydrate Flakes

Flue gas desulfurization flakes were produced from powdered gypsum calcium sulfate dihydrate obtained by the desulfurization of flue gas using the wet limestone process with forced oxidation. The compaction was effected in a double roll press machine with a horizontal centerline, 24" diameter rolls and 8" wide faces. Various conditions were used to measure the effect of each variable on the type of flake produced. Table 1 provides the conditions and Table 2 provides a description of the flakes produced by each run.

TABLE 1

| Run Number | Roll Clearance Inches | Roll Separating Force Tons/Linear Inch | Roll Speed RPM | Moisture Level % Free Water |
|---|---|---|---|---|
| 1 | 0.0625 | 4.06 | 10 | 8.5% |
| 2 | 0.0312 | 4.375 | 10 | 8.5% |
| 3 | 0.0312 | 4.375 | 6.5 | 8.5% |
| 4 | 0.0312 | 4.06 | 6.5 | 13.5% |
| 5 | 0.0312 | 4.50 | 6.5 | 10.7% |
| 6a | 0.0312 | 4.375 | 6.5 | 10.7% |
| 6b | 0.0312 | 4.687 | 6.5 | 10.7% |
| 7 | 0.0312 | 4.375 | 6.5 | 6.2% |
| 8 | 0.0312 | 4.687 | 6.5 | 2.2% |

TABLE 2

| Run Number | Product Thickness Inches | Average Chip Size Inches | % Fines ≧8 U.S. Mesh Size | Chip Characteristic Description |
|---|---|---|---|---|
| 1 | 0.155 | 1/4 × 1/2 | 15% | Good flakes |
| 2 | 0.151 | 1/4 × 1/2 | 13% | Good flakes, better than Run #1 |
| 3 | 0.145 | 1/4 × 3/4 | 13% | Good flakes, better than Run #2 |
| 4 | 0.146 | 1/4 × 1/4 | 26% | Poor flakes, sticky, not strong, many fines |
| 5 | 0.140 | 1/4 × 1 | 15% | Good flakes, larger size |
| 6a | 0.140 | 1/4 × 5/8 | 22% | Good flakes |
| 6b | 0.170 | 1/4 × 1 | 15% | Good flakes, better than 6a run |
| 7 | 0.090 | 1/4 × 1 | 19% | Good flakes, larger size, fines increased |
| 8 | 0.082 | 1/8 × 1/4 | 28% | Poor flakes, small size, not strong, fines increased |

Table 2 shows that gypsum calcium sulfate produced by the wet limestone process can be transformed into a chip having excellent characteristics for further processing. Run 8 shows that the wet process gypsum does not produce adequate chips at the low moisture conditions utilized for other byproduct gypsum. The flakes are weak and susceptible to breakage resulting in a large population of fines. Runs 1-3 show good flakes at 8.5% moisture and compaction at slightly better than 4 tons force. When the chips of Runs 1-3 are ground to a fine powder as would be done in the manufacture of wallboard and the resulting powder observed under optical magnification or by scanning electron microscope, substantial differences are noted in the crystal size and shape from that in the unprocessed, non compacted powder. The size, shape and particle size distribution appears to be more like that of natural gypsum calcium sulfate dihydrate. Natural gypsum calcium sulfate powder under optical magnification appears to have a generally cubic shape and a comparatively wide particle size distribution whereas gypsum calcium sulfate precipitate obtained by the wet limestone process has an elongated shape and a narrow particle size distribution.

EXAMPLE 2

Flue gas desulfurization flakes were produced from powdered gypsum calcium sulfate dihydrate obtained by the desulfurization of flue gas using the wet limestone process with forced oxidation. The compaction was effected in a double roll press machine with a vertical centerline, 18" diameter rolls and 4.75" wide faces. Various conditions were used to measure the effect of each variable on the type of flake produced. Table 3 provides the conditions and Table 4 provides a description of the flakes produced by each run.

TABLE 3

| Run Number | Roll Clearance Inches | Roll Separating Force Ton/Lineal Inch | Roll Speed RPM | Moisture Level % Free Water |
|---|---|---|---|---|
| 1 | 0.090 | 8.6 | 23.0 | 10.7 |
| 2 | 0.090 | 8.6 | 20.5 | 9.8 |
| 3 | 0.045 | 12.1 | 17.5 | 8.6 |
| 4 | 0.135 | 8.6 | 19.5 | 11.1 |
| 5 | 0.135 | 8.6 | 22.0 | 11.4 |
| 6 | 0.135 | 8.6 | 23.1 | 15.7 |

TABLE 4

| Run Number | Product Thickness Inches | Average Chip Size Inches | % Fines ≧8 U.S. Mesh Size | Chip Characteristic Description |
| --- | --- | --- | --- | --- |
| 1 | 0.122 | ¼ × 1 | 15% | Good flakes |
| 2 | 0.126 | ¼ × 1¼ | 14% | Excellent flakes |
| 3 | 0.145 | ¼ × 1 | 12% | Excellent flakes, very strong |
| 4 | 0.164 | ¼ × ½ | 17% | Good flakes |
| 5 | 0.148 | ¼ × ⅜ | 20% | Marginal flakes, strength lower |
| 6 | 0.152 | ⅛ × ¼ | 31% | Poor - unacceptable flakes, too many fines, not strong; sticky |

What is claimed is:

1. In a process for producing gypsum calcium sulfate dihydrate flake, the improvement for producing gypsum calcium sulfate dihydrate from powdered synthetic gypsum calcium sulfate dihydrate obtained by the wet limestone process for the desulfurization of flue gas which comprises:
   a) adjusting the surface moisture content of the powdered gypsum calcium sulfate dihydrate to a level of from about 5 to 12% by weight thereby forming a moist powder;
   b) compacting the moist powder in a compaction zone comprising a roller press exerting a pressure of from 4 tons force to 15 tons force per linear inch of sheet width;
   c) forming the moist powder under compression into a sheet having a thickness of from 0.05 to 0.25 inches;
   d) maintaining the sheet under compaction for a period of from 0.2 to 1.2 seconds; and,
   e) fracturing the sheet into chips.

2. The process of claim 1 wherein compaction in said compaction zone is provided in a double roll press.

3. The process of claim 2 wherein the double roll press comprises two rollers and the rollers have a diameter of from 1.5 to 3 feet.

4. The process of claim 3 wherein both rollers are rotated at a rate to provide a linear surface speed of from 0.5 to 2.5 feet per second.

5. The process of claim 4 wherein a temperature of 25° C. to 80° C. is maintained during the compaction of the gypsum calcium sulfate dihydrate.

6. The process of claim 1 wherein the surface moisture content is from 7–10% by weight of the gypsum calcium sulfate.

* * * * *

UNITED STATES PATENT AND TRADEMARK OFFICE
CERTIFICATE OF CORRECTION

PATENT NO. : 5,362,471
DATED : Nov. 8, 1994
INVENTOR(S) : Roth, et al.

It is certified that error appears in the above-indentified patent and that said Letters Patent is hereby corrected as shown below:

Column 2, line 65, after "approaching" insert -- that of natural gypsum. --

Signed and Sealed this

Second Day of May, 1995

BRUCE LEHMAN

Attest:

Attesting Officer

Commissioner of Patents and Trademarks